3,690,931
PARTICLED UREA COATED WITH MAGNESIUM DODECYL BENZENE SULFONATE
John J. Jasnosz, Jr., Santa Ana, Calif., assignor to Petrochemicals, Inc., Fort Worth, Tex.
No Drawing. Continuation of abandoned application Ser. No. 758,128, Sept. 6, 1968. This application Mar. 4, 1971, Ser. No. 121,198
Int. Cl. C05c 9/00; B44d 1/094
U.S. Cl. 117—100 A                    1 Claim

ABSTRACT OF THE DISCLOSURE

Particled urea coated with magnesium dodecyl benzene sulfonate in amounts of 0.025 to 0.15 percent by weight of the urea does not substantially cake on standing. Other compounds may also be used, but with less effectiveness.

CROSS-REFERENCE TO RELATED APPLICATIONS

A penetrometer and method of using same filed Dec. 19, 1966 under Ser. No. 608,717 by James Passmore, has issued as U.S. Patent No. 3,481,187. Also the present application is a continuation of U.S. application S.N. 758,128 filed Sept. 9, 1968, and now abandoned.

BACKGROUND OF THE INVENTION

Field of the invention

A method of anticaking particled urea and product formed as a result thereof.

Description of the prior art

In recent years urea has been used more and more increasingly in agriculture as a fertilizer, as well as in the manufacture of plastics and adhesives and in the paper-making and textile finishing industries. The nitrogen content of urea is relatively high (45% to 46%), which particularly commends it for the above mentioned uses. One operational disadvantage of particled urea is its tendency to cake into hard masses when stored for a substantial period of time. Such caked masses must be crushed or otherwise broken up into particles before the urea can be used as fertilizer or in manufacturing processes.

Crushing or breaking up of caked urea is not only expensive but time consuming, to such a degree as to restrict the widespread use of urea for the purposes described. Heretofore those methods which have been proposed and used to a limited extent in an attempt to inhibit particled urea against caking to a detrimental degree when stored over a substantial period of time have included the heat treating of the surfaces of the prills or particled urea, encapsulating the prills or particles, as well as adding an inert filler such as finely divided kaolin, limestone, silica, and the like, thereto in amounts ranging between 3% to 10% by weight of the urea being treated. In addition, finely divided plastics, rubber and graphites have been added to the urea, which act as release agents and prevent the urea particles or prills from firmly bonding to one another.

All of the prior techniques used to anticake particled urea have suffered from one or more of the following operational disadvantages:

(1) Unduly expensive and time-consuming processes required.
(2) Introduction of insoluble impurities into the urea.
(3) Production of weak, disintegrated urea particles.
(4) Production of urea particles which still cake under severe or unusual conditions.

The purpose of the present invention is to provide a method of anticaking particled urea that will minimize the operational disadvantages encountered in the past, as well as providing an improved particled or prilled urea which is not subject to caking to a detrimental degree.

SUMMARY OF THE INVENTION

The present invention is directed to a method of anticaking particled urea and the product resulting from the practice of the method that permits urea to be used easily and conveniently in industry and agriculture without danger of the urea setting into a hard mass which can be used only after being crushed or otherwise broken into small fragments.

A major object of the invention is to furnish a method of anticaking particled urea to minimize the tendency thereof to form into a hard mass after being stored over a substantial period of time, and permit the following characteristics of the anticaked urea to be utilized to the fullest extent:

(1) Excellent solubility;
(2) Inert to other constituents found in liquid fertilizer formulations;
(3) High nitrogen content;
(4) Non-explosive nature; and
(5) Protein supplement in livestock feed.

Another object of the invention is to produce an anticaked urea in the form of particles or prills, with the additive such as organo sulfonates used for this purpose being effective when present in but small amounts.

A further object of the invention is to provide a method of anticaking urea that is simple and easy to carry out, and one that requires no new or unusual equipment in the application of my invention.

Yet another object of the invention is to supply particled urea that has been treated according to my invention to minimize the tendency thereof to cake when subjected to storage over a substantial period of time without increasing the weight of the treated urea to the degree necessary as when previously available anticaking agents were used.

DESCRIPTION OF THE PREFERRED EMBODIMENT

The raw materials used in the production of urea are ammonia and carbon dioxide. The general reaction for producing urea is:

$$2NH_3 + CO_2 \rightarrow CO(NH_2)_2 + H_2O$$

The above reaction is carried out in a urea autoclave where under pressure and a relatively high temperature, ammonium carbamate is first formed that is later converted to urea, carbon dioxide and water. Great care is taken in the final production stages of the process to avoid the appearance of biuret or moisture in the product. The urea resulting from this reaction is particled.

In the present invention the particled urea resulting from the reaction just described is subjected to a minor amount of an additive such as an organosulfonate by tumbling, admixing, or otherwise placing the same on the surfaces of the urea particles. The treated urea produced by the present invention is particularly useful for agricultural applications where it is desirable that the characteristics of the urea include:

(1) Non-caking,
(2) High water solubility with a resulting clear solution, and
(3) High purity and high nitrogen analysis.

The organosulfonate agents of the present invention may be conveniently prepared by several methods well known to one familiar with the art, such as:

(I) Preparation by neutralization of an organosulfonic acid with a metallic hydroxide. For example, 10.8 grams of magnesium oxide will neutralize 100 grams of commercial xylenesulfonic acid to produce 106 grams of a dried conditioning agent.

(II) Preparation by methesis of an organosulfonate with a metallic salt. For example, 37.8 grams of magnesium sulfate (an excess) will decompose 100 grams of sodium dodecylbenzene sulfonate to produce 97 grams insoluble dry magnesium dodecylbenzene sulfonate. As a further example, 59.1 grams of magnesium sulfate septahydrate will decompose 100 grams of calcium monomethylnaphthalene sulfonate to produce 96.5 grams of soluble magnesium monomethylnaphthalene sulfonate.

(III) Preparation by indigenous neutralization affected by the addition of a solution of the organosulfonic acid onto a basic or amphoteric clay such as talc or magnesite.

A number of specific examples of the present invention are described below for illustrative purposes only.

Example No. 1: Fifty grams of urea prills, containing 0.23% moisture, were charged to a 400 ml. wide mouthed glass jar, after which 12.5 milligrams (0.025%) of magnesium dodecylbenzene sulfonate were added to the prills. The magnesium dodecylbenzene sulfonate was prepared by neutralizing an aqueous solution of dodecylbenzene sulfonic acid with magnesium oxide, drum-drying the resulting slurry, and grinding the subsequent powder to pass through a 236 mesh screen. The jar was then closed and tumbled for three minutes to achieve mixing of the contents thereof. The treated urea prills were placed in a 1½ inch inside diameter, polyethylene cylinder and sufficient force placed thereon to create a pressure of 12 lbs. p.s.i. Additional samples were similarly prepared, but treated with 0.025 to 0.15% magnesium dodecylbenzene sulfonate. After seven days at ambient temperatures, the hardness of the resulting cakes was determined via penetration with a ⅛ inch diameter rod, without removing the samples from their cylindrical containers, using a penetrometer of the type described in copending patent application, Ser. No. 608,717, entitled A Penetrometer and Method of Using Same which was filed by James Passmore on Dec. 19, 1966.

This test procedure was repeated, using calcium dodecylbenzene sulfonate prepared by neutralizing dodecylbenzene sulfonic acid with calcium hydroxide, drying and grinding to minus 236 mesh.

NO. 1 TEST USING PRODUCT OF EXAMPLE NO. 1

| Prilled urea: | Pressure to penetrate cake using penetrometer, p.s.i. |
|---|---|
| Control—no additive | 443 |
| .025% magnesium dodecylbenzene sulfonate | 190 |
| .05% magnesium dodecylbenzene sulfonate | 146 |
| .075% magnesium dodecylbenzene sulfonate | 142 |
| .10% magnesium dodecylbenzene sulfonate | 133 |
| .15% magnesium dodecylbenzene sulfonate | 217 |
| .025% calcium dodecylbenzene sulfonate | 399 |
| .05% calcium dodecylbenzene sulfonate | 325 |
| .10% calcium dodecylbenzene sulfonate | 264 |
| .15% calcium dodecylbenzene sulfonate | 463 |

Example No. 2: Various 50-gram quantities of urea prills containing 0.23% moisture were treated with 0 to .1% of the following magnesium organosulfonates in the same manner as Example No. 1. The magnesium organosulfonates were prepared as in Example No. 1, and consisted of the metallic alkyl benzene sulfonate class, and had the following molecular weights (M.W.): 384, 412, 454, 524, 594, 635 and 664.

NO. 2 TEST USING PRODUCT OF EXAMPLE NO. 2

| Prilled urea: | Pressure to penetrate cake using penetrometer, p.s.i. |
|---|---|
| Control—no additive | 447 |
| .05% magnesium alkyl benzene sulfonate, 384 M.W. | 81.3 |
| .10% magnesium alkyl benzene sulfonate, 384 M.W. | 61.0 |
| .05% magnesium alkyl benzene sulfonate, 412 M.W. | 89.4 |
| .10% magnesium alkyl benzene sulfonate, 412 M.W. | 40.6 |
| .05% magnesium alkyl benzene sulfonate, 454 M.W. | 171 |
| .10% magnesium alkyl benzene sulfonate, 454 M.W. | 122 |
| .05% magnesium alkyl benzene sulfonate, 524 M.W. | 195 |
| .10% magnesium alkyl benzene sulfonate, 524 M.W. | 146 |
| .05% magnesium alkyl benzene sulfonate, 594 M.W. | 203 |
| .10% magnesium alkyl benzene sulfonate, 594 M.W. | 122 |
| .05% magnesium alkyl benzene sulfonate, 635 M.W. | 130 |
| .10% magnesium alkyl benzene sulfonate, 635 M.W. | 97.6 |
| .05% magnesium alkyl benzene sulfonate, 664 M.W. | 130 |
| .10% magnesium alkyl benzene sulfonate, 664 M.W. | 61.0 |

Example No. 3: Various 50-gram samples of urea prills, containing 0.25% moisture, were treated with 0 to 0.1% of the following metallic monomethylnaphthalene sulfonates in the same manner as in Example No. 1. The sulfonates were prepared by reacting the water-soluble calcium salt of monomethylnaphthalene sulfonic acid with the appropriate metallic magnesium, zinc, cupric or ferrous sulfate and separating out the insoluble calcium sulfate by filtration. The metallic sulfonates were drum-dried and ground to minus 236 mesh particle size.

NO. 3 TEST USING PRODUCT OF EXAMPLE NO. 3

| Prilled urea: | Pressure to penetrate cake using penetrometer, p.s.i. |
|---|---|
| Control—no additive | 610 |
| .05% magnesium monomethylnaphthalene sulfonate | 528 |
| .10% magnesium monomethylnaphthalene sulfonate | 406 |
| .05% zinc monomethylnaphthalene sulfonate | 569 |
| .10% zinc monomethylnaphthalene sulfonate | 512 |
| .05% cupric monomethylnaphthalene sulfonate | 609 |
| .10% cupric monomethylnaphthalene sulfonate | 488 |
| .05% ferrous monomethylnaphthalene sulfonate | 536 |
| .10% ferrous monomethylnaphthalene sulfonate | 447 |

Example No. 4: Fifty-gram samples of urea prills containing 0.25% moisture were treated in the same manner as in Example No. 1 with 0 to 3% various inert, finely divided fillers. The test procedure was subsequently repeated, employing the same fillers to which had been blended 3% by weight of magnesium dodecylbenzene sulfonate.

NO. 4 TEST USING PRODUCT OF EXAMPLE NO. 4

Prilled urea: Pressure to penetrate cake using penetrometer, p.s.i.
- Control—no additive _____ 626
- 1% kaolin _____ 464
- 2% kaolin _____ 366
- 3% kaolin _____ 260
- 1% (97% kaolin, 3% magnesium DDBS) __ 284
- 2% (97% kaolin, 3% magnesium DDBS) __ 130
- 3% (97% kaolin, 3% magnesium DDBS) __ 48.8
- 1% diatomite _____ 643
- 2% diatomite _____ 341
- 3% diatomite _____ 285
- 1% (97% diatomite, 3% magnesium DDBS) _ 252
- 2% (97% diatomite, 3% magnesium DDBS) _ 138
- 3% (97% diatomite, 3% magnesium DDBS) _ 65
- 1% limestone _____ 244
- 2% limestone _____ 101
- 3% limestone _____ 48.8
- 1% (97% limestone, 3% magnesium DDBS) _ 65
- 2% (97% limestone, 3% magnesium DDBS) _ 32.5
- 3% (97% limestone, 3% magnesium DDBS) _ 20.3
- 1% silica _____ 217
- 2% silica _____ 102
- 3% silica _____ 73.2
- 1% (97% silica, 3% magnesium DDBS) ___ 130
- 2% (97% silica, 3% magnesium DDBS) ___ 89.5
- 3% (97% silica, 3% magnesium DDBS) ___ 69.1
- 1% talc _____ 626
- 2% talc _____ 585
- 3% talc _____ 386
- 1% (97% talc, 3% magnesium DDBS) _____ 430
- 2% (97% talc, 3% magnesium DDBS) _____ 390
- 3% (97% talc, 3% magnesium DDBS) _____ 345
- 1% magnesite _____ 1550
- 2% magnesite _____ 1400
- 3% magnesite _____ 1030
- 1% (97% magnesite, 3% magnesium DDBS) _ 1490
- 2% (97% magnesite, 3% magnesium DDBS) _ 1040
- 3% (97% magnesite, 3% magnesium DDBS) _ 659

In each of the above examples the percentage of the additive is by weight.

The anticaking agents described herein may be introduced onto the surfaces of urea particles or prills by agitation in a rotating cylindrical drum. Also, the agent may be applied to particled urea by a belt or screw conveyor. In addition, the agent may be sprayed onto the exterior surfaces of the urea particles or prills, with the urea thereafter being dried.

The anticaking agents may also be mixed with an inert particled filler, and the mixture then applied to the surfaces of the particled urea. Also, the agents may be dissolved in melted urea prior to prilling, as well as in the mother liquor prior to crystallization.

I claim:

1. An uncolored, non-toxic, free-flowing, particled urea in which at least the surface portions of said particles have an agent of magnesium dodecyl benzene sulfonate incorporated therewith to the extent that said particles do not substantially cake upon standing, with said agent being present in the range of 0.025 to 0.15 percent by weight of said urea.

References Cited

UNITED STATES PATENTS

| | | | |
|---|---|---|---|
| 2,586,709 | 2/1952 | Phillips | 71—64 X |
| 2,616,787 | 11/1952 | Whetstone | 71—64 X |
| 2,705,681 | 4/1955 | Wishlinski | 117—100 X |
| 2,786,868 | 3/1957 | Duncan et al. | 260—503 X |
| 2,826,612 | 3/1958 | Over et al. | 260—555 |
| 2,973,089 | 2/1961 | Brichard et al. | 117—100 X |
| 3,313,615 | 4/1967 | Formaini | 117—100 X |
| 3,481,187 | 12/1969 | Passmore | 117—100 X |
| 3,563,724 | 8/1971 | Wilson | 260—555 |
| 3,272,613 | 9/1966 | Young | 71—64 X |

FOREIGN PATENTS

| | | | |
|---|---|---|---|
| 935,999 | 9/1963 | Great Britain | 260—555 |

WILLIAM D. MARTIN, Primary Examiner

M. R. P. PERRONE, Jr., Assistant Examiner

U.S. Cl. X.R.

71—28, 64 E; 117—16; 260—503, 555 C